April 7, 1964  R. E. YOUNG  3,128,322
METHOD OF MOLDING
Filed Oct. 25, 1960
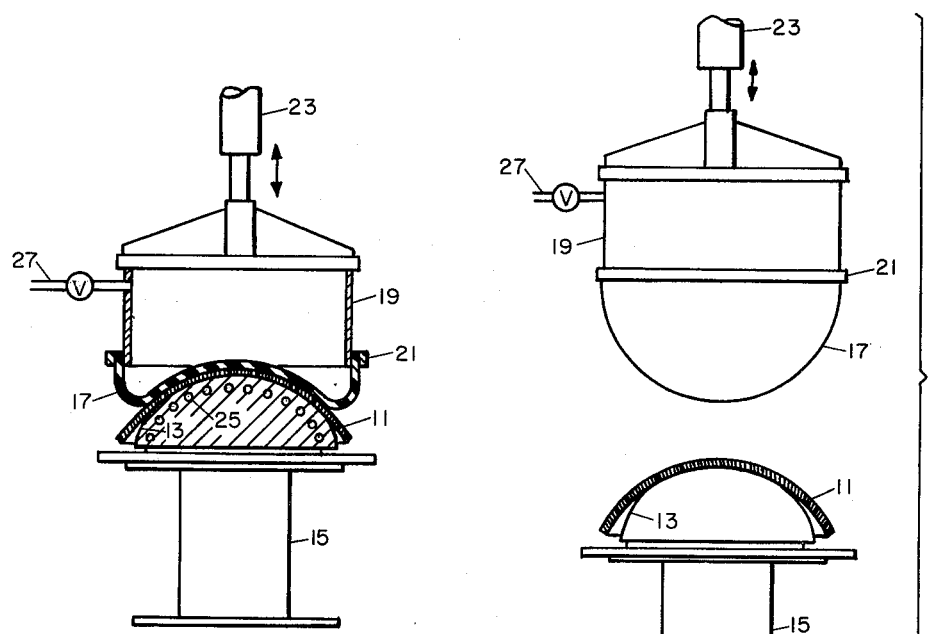
FIG. 1
FIG. 2
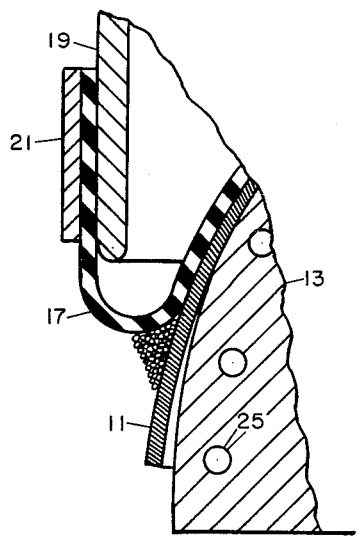
FIG. 3
RICHARD E. YOUNG
*INVENTOR.*
BY Ernest G. Peterson
AGENT 3,128,322
METHOD OF MOLDING
Richard E. Young, Rocky Hill, N.J., assignor to Hercules Powder Company, Wilmington, Del., a corporation of Delaware
Filed Oct. 25, 1960, Ser. No. 64,946
1 Claim. (Cl. 264—314)

This invention relates to improvements in molding shaped articles and structures from fibrous material impregnated with a curable thermosetting resin binder. More particularly this invention relates to improvements in molding shaped articles and structures from fibrous material impregnated with a curable thermosetting resin binder, which improvements insure freedom from air pockets in the molded structure and also insure substantially uniform distribution of resin binder throughout the molded structure with removal of air and excess uncured thermosetting resin during the molding operation.

Methods are known for forming various hollow elements such as vessels having end closures by applying a plurality of intermeshing helical wrappings of filament strands over a suitable mandrel with coating and impregnating of the applied wrappings of filament strands with a curable thermosetting resin binder. The impregnated wrappings of filament strands are then cured on the mandrel by heating, and the cured object is removed from the mandrel. Other methods are known for molding various hemispherical, ovaloid and irregular shaped articles and structures from fibrous material coated and/or impregnated with a curable thermosetting resin binder. However, the molding methods heretofore known have been subject to various limitations with respect to the range of applicability and/or uniformity in the molded structure.

It is, therefore, an object of the present invention to provide an improved method for molding shaped articles and structures from fibrous material impregnated with curable thermosetting resin.

It is a further object of this invention to provide improvements in molding such material in which substantially uniform distribution of thermosetting resin binder throughout the molded structure is obtained, with removal of any excess uncured thermosetting resin during the molding operation.

Another object of this invention is to provide improvements in molding such material, which insures freedom from air pockets in the molded structure.

The foregoing objects, as well as others which will become apparent from the following description, are accomplished in accordance with this invention which, generally described, comprises placing a layer of fibrous material impregnated with an uncured thermosetting resin on a mold form, initially applying pressure to the layer of impregnated fibrous material at a locus in the central area of said layer to force the same at said locus against the mold form, thereafter progressively advancing the application of pressure to the layer of impregnated fibrous material outwardly in all directions from said locus toward the margins of said layer while maintaining pressure on the areas of said layer to which pressure is already applied until all areas of said layer in contact with the mold form are under pressure, and heating the impregnated fibrous material while under said pressure to cure the thermosetting resin therein. In this invention, the initial application of pressure to the layer of impregnated fibrous material at a locus in the central area thereof, followed thereafter by progressively advancing the application of pressure to the layer of impregnated fibrous material outwardly in all directions from said locus toward the margins of said layer is termed "sequential molding." The importance of such sequential molding is that any air in the impregnated fibrous material, and excess uncured thermosetting resin are squeezed out of the impregnated fibrous material ahead of the progressively advancing pressure front, thus insuring a molded structure having a uniform distribution of resin binder therein, and free of air pockets.

In accordance with this invention, a layer of fibrous material impregnated with an uncured thermosetting resin is placed over the convex surface of a male mold form. An inflated flexible bag is then brought into initial pressure contact with the impregnated fibrous material at a locus in the central area of the layer, generally over the highest point of the mold form, to force the impregnated fibrous material at said locus of initial contact against the mold form, and thereafter progressively enveloping all areas of the layer of impregnated fibrous material over the mold form by the inflated flexible bag from said locus of initial pressure contact outwardly in all directions to the extremity of the mold form. The impregnated fibrous material is then heated while under the positive pressure of the enveloping inflated bag to cure the thermosetting resin therein. As the inflated bag progressively envelops the impregnated fibrous material over the mold form, there is a progressive advance of the application of pressure to the impregnated fibrous material outwardly in all directions from the locus of initial contact to the extremity of the mold form. By this means, any air in the impregnated fibrous material, and excess uncured thermosetting resin are squeezed out of the impregnated fibrous material ahead of the progressively advancing pressure front represented by the advancing line of contact of the inflated bag with the impregnated fibrous material. Any unevenness in distribution of thermosetting resin in the fibrous material is thus evened out, and wrinkles in the layer of fibrous material are smoothed out. The result is a smooth molded piece which is free of air bubbles and which has a highly uniform distribution of resin binder content.

In further describing this invention, reference is had to the accompanying drawing in which:

FIG. 1 is an elevational view partly in section illustrating apparatus for carrying out one embodiment of the invention, in which an inflated flexible bag is employed in cooperation with a male mold form for forming shaped structures in accordance with this invention, and showing the inflated flexible bag enveloping the impregnated fibrous material over the mold form;

FIG. 2 is an elevational view of the same apparatus shown in FIG. 1 with the inflated flexible bag in the raised position out of contact with the layer of impregnated fibrous material, said layer of impregnated fibrous material being shown in section.

FIG. 3 is an enlarged sectional view showing how air and excess uncured thermosetting resin are squeezed out of the impregnated fibrous material ahead of the progressively advancing pressure front represented by the advancing line of contact of the inflated bag with the impregnated fibrous material.

With reference to FIGS. 1 and 2, a layer of fibrous material 11, impregnated with an uncured thermosetting resin binder material is placed over a male mold form 13 mounted on a suitable support 15. An inflated flexible bag 17, attached by means of a clamping band 21 over the end of a hollow cylinder 19, is lowered into pressure contact with the impregnated fibrous material over the highest point on the mold form by means of a hydraulic ram 23, connected to hollow cylinder 19 and actuated by a conventional hydraulic cylinder or equivalent mechanism (not shown), thus applying positive pressure to the layer of impregnated fibrous material being formed. The inflated bag is then progressively lowered onto the layer of impregnated fibrous material by the hydraulic ram, thereby causing a progressive advance of the application of pressure to the impregnated fibrous material outwardly in all directions from the initial area of pressure contact to the extremity of the mold form as the inflated bag progressively envelops the layer of impregnated fibrous material over the mold form. It will be obvious, of course, that alternatively the flexible bag and hollow cylinder assembly can be made stationary, and the mold form can be raised and lowered by means of a hydraulic ram or equivalent means.

It may be found desirable to employ a pair of conventional clamping plates to hold the relatively limp sheet or mat of impregnated fibrous material during the forming operation to assist in preventing the formation of wrinkles in the material. Such clamping plates have a cut-out or central opening generally conforming with the horizontal cross section of the male mold form, and are adapted to be progressively lowered over the male mold form just ahead of the enveloping molding bag during the forming operation. The pressure on these clamping plates is controlled so that the impregnated layer of fibrous material being molded can slip therebetween without the formation of wrinkles as the clamping plates are progressively lowered over the male mold form.

FIG. 3 illustrates how air and excess uncured thermosetting resin are squeezed out of the impregnated fibrous material ahead of the progressively advancing pressure front. The impregnated fibrous material is then cured while under the positive pressure of the enveloping inflated bag by means of heating elements 25 in the mold form, which may be ducts as illustrated, electrical heating elements, or other equivalent means for supplying heat for curing the thermosetting resin binder in the fibrous material. Pressurizing fluid for inflating the flexible bag 17 is introduced via valved line 27. The pressure in the inflated flexible bag will be between about 1 p.s.i. and about 100 p.s.i.

The flexible bag employed in this embodiment preferably is an elastomer such as rubber, polychlorobutadiene, or a silicone polymer having high strength and limited extensibility, and capable of withstanding the elevated temperatures employed for curing the thermosetting resin binding material employed. The flexible bag may be reinforced with fiber or fabric, if desired, in order to reduce its extensibility and still maintain flexibility. Such reinforcement allows the process to be carried out at a higher pressure than when an unreinforced flexible bag is used.

Hollow cylinder 19 should provide sufficient space for the mold and molded part to enter as the inflated bag envelops the layer of fibrous material over the mold form.

This invention contemplates the use of liners or transfer sheets between the surface of the fibrous material being molded and the molding bag, or between the fibrous material and the heavy particles. Such liners or transfer sheets improve the surface of the molded piece, prevent adhesion of the molding bag or heavy particles to the molded piece, and otherwise facilitate the molding operation. Such liners are conventional in the molding art, and are flexible, have sufficient extensibility to conform faithfully to the desired molded form, are preferably resistant to the molding temperatures employed and do not adhere to the molded piece. Conventional mold release agents such as solid oils, waxes, silicones, stearic acid, and the like, may also be used between the fibrous material being molded and the surface of the mold form to facilitate removal of the molded piece from the mold form.

A particularly useful application of this invention resides in molding shaped articles and structures from fibrous material comprising multiple laminations of intermeshed glass filaments impregnated with an uncured thermosetting resin obtained by applying a plurality of intermeshing helical wrappings of continuous glass filament strands over a cylindrical mandrel of suitable length and diameter, with coating and impregnation of the wrappings with a curable thermosetting resin, as described in U.S. Patent 2,843,153 to Richard E. Young, and then slitting or cutting the cylinder of applied wrappings lengthwise to form a flat mat. Spun glass filaments are preferred, since they afford a higher ratio of strength to weight than any other fiber or filament.

However, this invention is not limited to the use of glass filaments, or to a mat formed as set forth above, for practice of this invention contemplates an improved method of molding applicable without limitation to any assembly of fibrous material impregnated with any uncured thermosetting resin. By way of example, the fibrous material employed can be natural animal or vegetable fibers; such as, hair, wool, cotton, sisal, hemp, ramie, and the like; synthetic filaments and staple fibers derived from such materials as regenerated cellulose, cellulose esters, cellulose ethers, nylon, polyethylene terephthalate, polyethylene, polypropylene, vinylidene chloride, polyacrylonitrile, casein or similar proteinaceous material, and the like, without limitation; and fibers and filaments derived from mineral substances, such as mineral wool, asbestos, spun glass filaments, and the like; and mixtures of fibers and filaments of these various derivations. Such fibrous material can be in the form of a layer comprising a felted mat of unwoven fibers or filaments; or a layer comprising a plurality of sheets of woven or knitted threads or filaments; or a layer comprising a mat formed by applying a plurality of intermeshing helical filament wrappings over a cylindrical mandrel, and then cutting the cylinder of applied wrappings lengthwise, as set forth hereinabove.

Any curable thermosetting resin can be employed to impregnate the fibrous material for the purposes of this invention. A great variety of such resins are known in the art, and include by way of example such materials as epoxy compounds, alkyd resins, phenol aldehyde and urea aldehyde resins, melamine aldehyde resins, and other polyfunctional resinous materials capable of forming three dimensional cross-linked polymers when cured. Such thermosetting resins in the uncured state are liquid, and are applied to the fibrous material by any suitable method, such as by immersion of the fibrous material in the uncured resin, by spraying, by doctor blade application, by roller coat application, and the like. Usually an excess of the uncured resin is employed to insure complete and saturated impregnation of the fibrous material, and then removing excess resin by the sequential molding method of this invention. The choice of uncured thermosetting resin in any particular case will depend largely on economics and end use application of the molded structure.

Curing of the thermosetting resins employed in this invention by heating follows conventional prior art practice, and it is customary for the manufacturers of such resins to furnish curing instructions relative to proper temperature and pressure ranges and curing times necessary to convert their resins to the insoluble, infusible, three dimensional cross-linked polymeric state.

As noted hereinabove, the principal objective of the sequential molding method of this invention is to insure a molded structure having a uniform distribution of resin binder therein, and free of air pockets. This is accomplished in accordance with this invention by squeezing any air and excess uncured thermosetting resin out of the impregnated fibrous material ahead of the progressively advancing pressure front. It follows, therefore, that the pressure applied to the impregnated fibrous material during the sequential molding steps of this invention must be sufficient to force air and excess uncured thermosetting resin out of the impregnated fibrous material ahead of the advancing pressure front. Obviously, the pressure necessary to accomplish the purposes of this invention will depend on several factors, including, for example, the particular uncured thermosetting resin employed, the thickness of the layer of fibrous material employed, the type of fibrous material employed, and the physical formation of the assembly of such fibrous material, whether in the form of a felted mat of unwoven fibers, woven or knitted sheets or a mat of intermeshed filaments, and the like. However, the necessary pressure in any particular case is readily ascertained by simple trail. In general, suitable pressures will be between about 1 p.s.i. and about 100 p.s.i.

The following example sets forth a specific embodiment of the invention. It is to be understood, however, that the invention is no way limited to this example, since this invention may be practiced by the use of various modifications within the scope of the invention as hereinabove described.

*Example*

This example illustrates the formation of a hard, rigid dome-shaped member for use as reinforcement in one end of a pressure cylinder 36 inches in diameter.

Oriented mat material for this dome-shaped member was prepared on a filament winding machine as described in U.S. Patent 2,843,153 to Richard E. Young by the continuous winding of strands of 12-end roving in which 12 such strands were simultaneously applied in the form of a ribbon. Each end of each 12-end strand contained 204 monofilaments of glass each approximately 0.0002 inch in diameter. The 12-strand glass fiber ribbon was wound in a helix at 45° continuing from one end of the winding mandrel to the other and reversing over the ends. This system of winding deposited the glass fiber material in right and left hand helices which progressed uniformly to generate complete multiple coverage of the mandrel surface. Winding was continued until the thickness of the applied wrappings was approximately 0.1 inch.

Liquid uncured thermosetting epoxy resin designated as Epon Resin 828, catalyzed prior to use with Epon Curing Agent CL (Shell Chemical Company, 380 Madison Avenue, New York, N.Y.), was applied during the winding operation by running the glass fiber strands through a reservoir of the resin and wiping off excess resin before applying the glass fiber strands to the winding mandrel.

Upon completion of the winding, the glass fiber composite was cut longitudinally along the mandrel, and the end windings were removed by cutting, leaving a rectangular sheet of interwoven glass filament stands impregnated with uncured thermosetting resin, in which all filaments were laid at 45° to the sheet edges. Half of the glass fiber material was oriented at 45° in one direction and the other half was oriented at 45° in the opposite direction, thus intersecting at 90°. The glass fiber mat thus prepared by filament winding was then cut to proper blank size for forming the dome-shaped member.

With reference to FIGS. 1 and 2, the convex surface of the male mold form 13 and the outer contacting surface of the flexible molding bag 17 are prepared for the molding operation by applying to each a thin film of a silicone mold release agent designated as Dow Corning No. 7 Compound (Dow Corning Corp., 592 Saginaw Road, Midland, Michigan), whereupon the previously prepared mat of glass fiber material impregnated with uncured thermosetting epoxy resin was laid over the male mold form and the molding bag, inflated to a pressure between 5 and 10 pounds per square inch, was lowered by means of hydraulic ram 23 onto the mat of glass fiber material at the rate of approximately 2 inches per minute until the mat over the mold form was enveloped by the molding bag. The pressure in the molding bag was increased to approximately 20 pounds per square inch, and the temperature of the molding assembly was elevated to approximately 250° F. by heating elements in the mold form, and the pressure and temperature were maintained for 2 hours to cure the thermosetting resin in the glass fiber material and thus produce a hard, rigid dome-shaped member.

During the sequential molding operation, air and excess uncured thermosetting resin were squeezed out of the impregnated glass fiber mat ahead of the enveloping molding bag, and the molded dome upon removal from the press assembly was smooth, free of air bubbles, with a highly uniform distribution of resin binder throughout.

From the foregoing description, it will be seen that the present invention is a valuable improvement in the manufacture of various molded articles derived from fibrous material bonded with a thermosetting resin, such as end closures for pressure vessels, radiosondes, housings of various kinds, boat hulls, and the like. The method of this invention is characterized by the relative simplicity of the molding operation, and the molded objects obtained thereby are characterized by being free of air pockets or bubbles and by having a highly uniform distribution of resin binder throughout.

What I claim and desired to protect by Letters Patent is:

The process for molding shaped structures of resin-impregnated fibrous material which comprises
  (a) placing a layer of fibrous material consisting essentially of a mat of intermeshed glass filaments impregnated with an uncured thermosetting resin on a mold form,
  (b) initially applying pressure to the layer of impregnated fibrous material at a locus in the central area of said layer by bringing a preinflated, substantially hemispherical, flexible, substantially nonextensible bag into initial pressure contact with said layer at said locus by movement relative to each other of said bag and said impregnated fibrous material to force said layer at said locus against the mold form,
  (c) thereafter progressively advancing the application of pressure to the layer of impregnated fibrous material outwardly in all directions from said locus toward the margins of said layer while maintaining pressure on the areas of said layer to which pressure is already applied by progressively enveloping all areas of said layer with said bag from said locus of initial pressure contact outwardly to the extremity of the mold form by continued movement relative to each other of said bag and said impregnated fibrous material, thereby creating a progressively increasing pressure gradient across the advancing pressure front to force air and excess uncured thermosetting resin out of the impregnated fibrous material ahead of the advancing pressure front, and
  (d) heating the impregnated fibrous material while under the pressure exerted by the enveloping inflated flexible bag to cure the thermosetting resin therein.

References Cited in the file of this patent

UNITED STATES PATENTS

| | | |
|---|---|---|
| 1,559,972 | Midgley | Nov. 3, 1925 |
| 1,959,565 | Brostrom | May 22, 1934 |
| 1,970,506 | Womeldorff | Aug. 14, 1934 |
| 2,187,918 | Sloan | Mar. 28, 1936 |
| 2,401,299 | Glavin | June 4, 1946 |
| 2,517,701 | Oettinger | Aug. 8, 1950 |
| 2,531,218 | Johnson | Nov. 21, 1950 |
| 2,565,949 | Clifford et al. | Aug. 28, 1951 |
| 2,945,262 | Petty | July 19, 1960 |
| 2,977,268 | Randolph | Mar. 28, 1961 |
| 2,977,269 | Nerwick | Mar. 28, 1961 |

FOREIGN PATENTS

| | | |
|---|---|---|
| 313,307 | Great Britain | June 20, 1929 |
| 399,578 | Great Britain | Oct. 12, 1933 |
| 671,832 | Great Britain | May 14, 1952 |

OTHER REFERENCES

"Shot Molding," India Rubber World, April 1, 1941, page title "Europe—Great Britain."